United States Patent [19]

Vom Stein et al.

[11] 3,763,980

[45] Oct. 9, 1973

[54] ASSEMBLY SET FOR ERECTING ROLLER CONVEYORS

[75] Inventors: Hans Vom Stein; Dieter Specht, both of Wermelskirchen, Germany

[73] Assignee: Hans Von Stein O.H.G., Dhunn-Rhld., Germany

[22] Filed: Nov. 14, 1969

[21] Appl. No.: 876,671

[30] Foreign Application Priority Data
June 30, 1969 Germany............... P 19 33 067.7

[52] U.S. Cl............................................. 193/35 R
[51] Int. Cl................................................ B65g 13/11
[58] Field of Search........................... 193/35, 36, 37; 198/127; 46/25, 26

[56] References Cited
UNITED STATES PATENTS

| | | | |
|---|---|---|---|
| 2,470,275 | 5/1949 | Warshaw | 193/35 R |
| 2,565,823 | 8/1951 | Pool | 46/25 |
| 2,947,053 | 8/1960 | Sanderson | 46/25 UX |
| 3,268,099 | 8/1966 | Ajero et al. | 193/35 X |
| 3,444,973 | 5/1969 | Nygren | 193/35 R |
| 3,509,978 | 5/1970 | Bedford | 193/35 |

FOREIGN PATENTS OR APPLICATIONS

| | | | |
|---|---|---|---|
| 100,478 | 11/1964 | Denmark | 193/35 J |
| 1,192,585 | 5/1965 | Germany | 193/35 R |

Primary Examiner—Evon C. Blunk
Assistant Examiner—Bruce H. Stoner, Jr.
Attorney—Michael S. Striker

[57] ABSTRACT

An assembly set for erecting roller conveyors includes a plurality of structural elements each of which has a housing provided in its upper side with a recess in which a spherical or cylindrical rolling element is turnably accommodated with a portion thereof projecting upwardly beyond the upper side so as to contact and support a load which is to be transported. Releasable connecting means, separate from or provided on the respective structural elements, serves for releasably connecting the same to one another so as to enable the construction of differently configurated roller conveyors at the will of a user.

22 Claims, 11 Drawing Figures

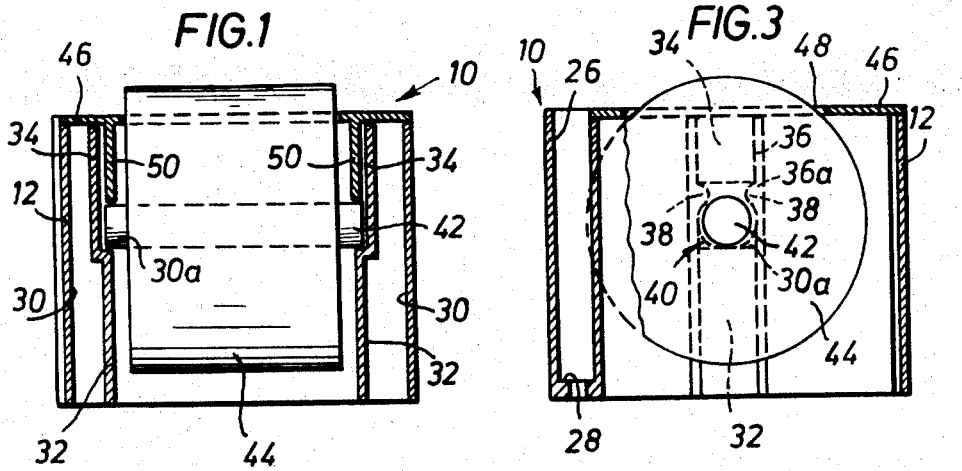
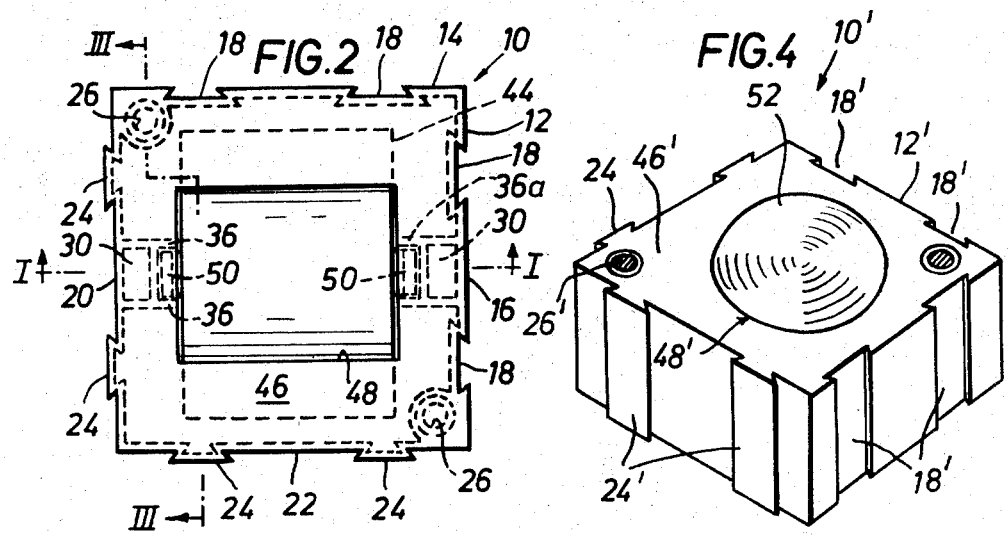
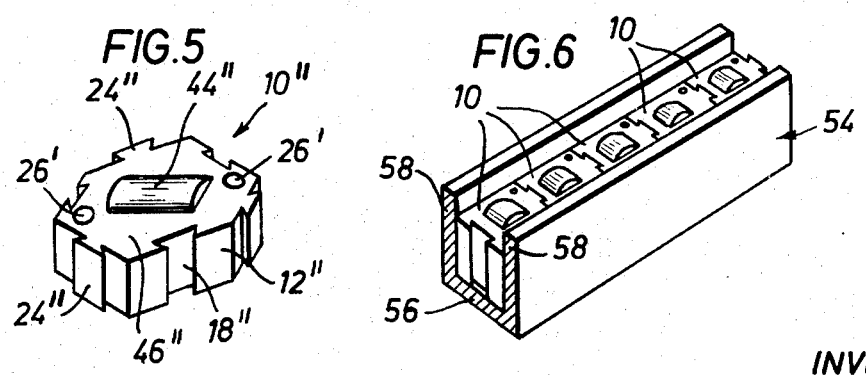

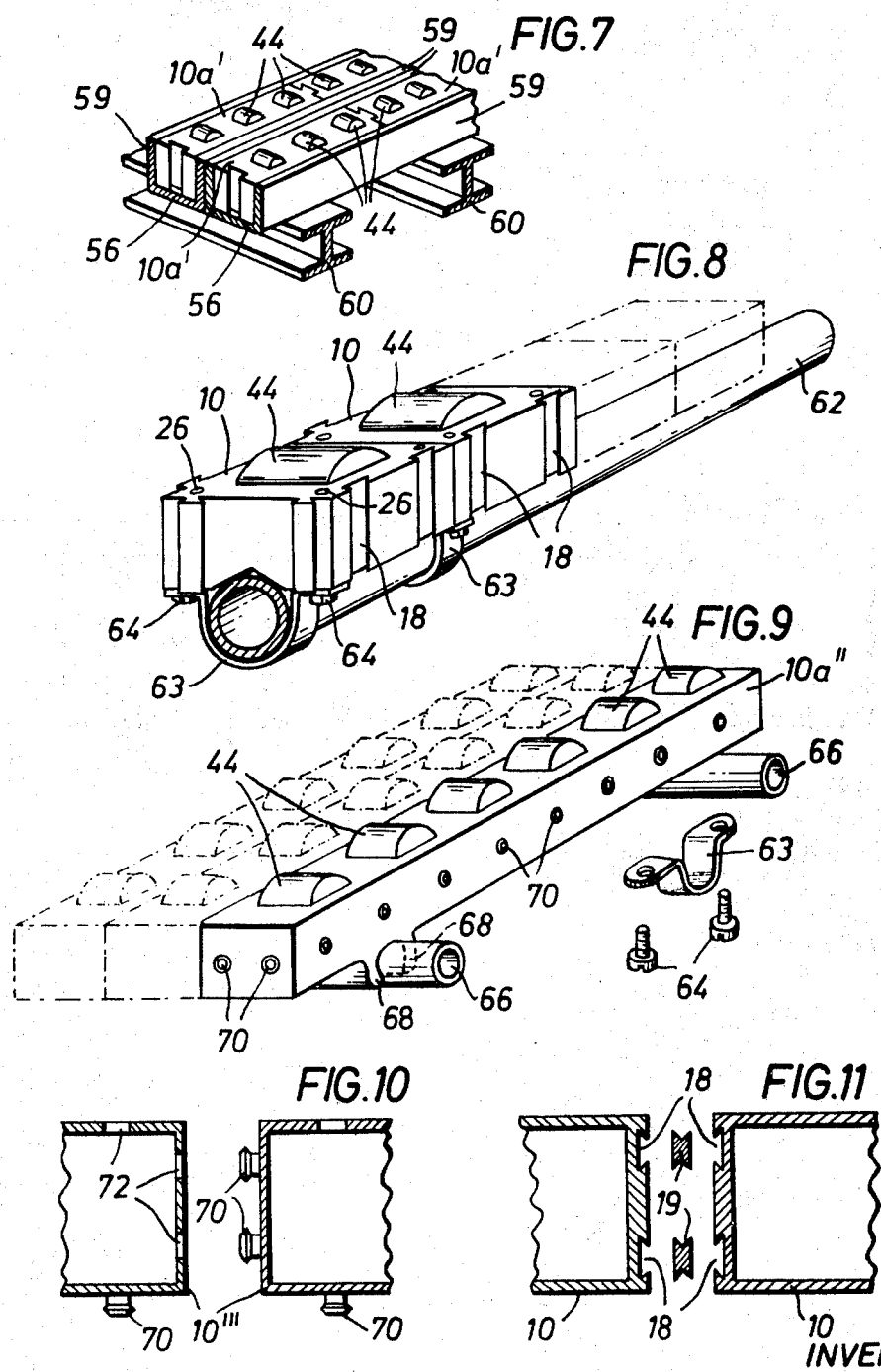

3,763,980

ASSEMBLY SET FOR ERECTING ROLLER CONVEYORS

BACKGROUND OF THE INVENTION

The present invention relates generally to roller conveyors, and more particularly to an assembly set for erecting such roller conveyors.

Roller conveyors are already known. They are based on the principle that a plurality of rollers may be mounted along a predetermined path along which a load is to be transported, and that the load then rests on these rollers and moves along the predetermined path in response to turning of the rollers. If the rollers are not driven, then they simply serve to reduce friction against the load so that the same may be transported readily by being advanced along and in contact with the rollers. It is known to use for this purpose a variety of different rolling elements. Some of these may be in cylindrical form, that is they may be rollers mounted for turning movement about a substantially horizontal axis. Again, it is known to use others which are of spherical configuration and mounted with complete freedom of turning movement. With a roller conveyor utilizing the latter type of rolling elements the load being conveyed can be moved in any desired direction whereas with a roller conveyor using cylindrical rolling elements the load can be advanced only in direction substantially transversely to the axes of rotation of the individual rolling elements. Further, it is known to construct roller conveyors wherein a plurality of cylindrical or approximately ellipsoid-shaped rolling elements are mounted on a rolling element carrier which itself is turnable about a substantially horizontal axis, and this construction also permits conveying of a load in all directions.

Roller conveyors of these types are widely used. Thus, they find use in stock rooms, in the transportation of goods and materials through industrial plants, in freight-carrying aircraft and the like.

The problem with all known constructions is that they are bulky, heavy and cannot be readily adapted to changing circumstances—that is for instance to a shifting of the path over which the load is to be conveyed—nor moved to other locations.

SUMMARY OF THE INVENTION

It is, accordingly, an object of the present invention to overcome the aforementioned disadvantages.

A more particular object of the present invention is to provide an assembly set for erecting roller conveyors which are not possessed of these disadvantages.

A concomitant object of the invention is to provide such an assembly set which makes it possible to erect roller conveyors of a great variety of different configurations, and which permits ready disassembly of the thus-erected conveyors, either because they are no longer needed or because they are to be employed at a different location.

Still a further object of the invention is to provide such an assembly kit which permits the erecting of roller conveyors of different sizes and surface area, that is conveyors which may be narrow and long, wide and short, which may cover large surface areas such as an entire floor, and which can be readily adapted to different conditions and requirements by changing the size and/or configuration of the erected roller conveyor.

In addition, it is also an object of the present invention to provide such an assembly kit which is simple and economical in its construction and whose individual structural elements can readily be assembled or disassembled.

In pursuance of the above objects, and others which will become apparent hereafter, one feature of our invention resides, briefly stated, in an assembly set for erecting roller conveyors which includes at least two structural elements, with each of these elements comprising a housing having an upper side, at least one recess provided in this upper side, and a rolling element turnably accommodated in this recess and projecting in part upwardly beyond the upper side so as to contact and support a load which is to be transported on a roller conveyor erected with the set. Releasable connecting means releasably connect the structural elements to one another in a plurality of relative positions in each of which the upper sides are at least substantially located in a common plane.

The dimensions of each individual structural element of the set according to the present invention are relatively small, and it is therefore possible to utilize these elements to erect roller conveyors of almost any desired configuration on almost any available surface area. Preferably, the outline of the housing of each of the structural elements resembles a regular polygon. Most advantageous have been found outlines which are quadratic, rectangular or hexagonal because thus-configurated housings can be most readily assembled in any desired shape.

The rolling element or elements in each housing may be cylindrical, they may be spherical, or they may be cylindrical or substantially ellipsoid-shaped but mounted on a carrier which itself is turnable with reference to the housing. Two or more such rolling elements may be associated with each housing, and the housing may be of substantially rectangular outline with the elements arranged length-wise of the housing. If the housing is elongated it may be used to bridge the distance between two shafts, tubular members or the like, such as the rods which constitute a grid or similar structure.

The connecting means suitable for releasably connecting the individual structural elements to one another may be of various different types. Preferably, but not necessarily, they are mating coupling means provided on the lateral faces of the respective housings. If the outline of the housing is that of a regular polygon, then the connection of structural elements in any desired relationship is particularly easy if at least the faces of a pair of transversely spaced opposite lateral faces of each housing are each provided with two coupling means, with those on one face being configurated so as to mate with those on the other face, so that they can mate with the coupling means on the other face of another structural elements to which they are to be connected. If each lateral face of each housing is provided with two coupling elements, this provides for a particularly stable structure when two or more such structural elements are connected with one another.

Advantageously, but not necessarily, the housing may consist of synthetic plastic material and may for instance be produced by injection molding. If the housings use cylindrical rolling elements, then they may be formed with suitable seats for the axis or shaft about which the respective cylindrical rolling element turns, so that it is then simply necessary to place the rolling element in position with reference to the recess of the housing, and to insert it into the recess so that each end of the rolling axis or shaft becomes lodged in the journal provided for it. The journals may be configured so that the end portions of the respective shaft are introduced with a snap action and are thereby reliably held in position.

Our novel assembly set may further comprise support means for supporting two or more of the structural elements in predetermined relationship with one another. Thus, if a long comparatively narrow roller conveyor is to be constructed, the support means may be a channel member of U-shaped cross-sectional configuration which accommodates a plurality of the structural elements aligned with reference to the elongation of the channel member. The channel member is of course opened at the upper side and if desired its lateral arms may project upwardly beyond the upper sides of the structural elements accommodated in it, so that the arms constitute lateral guide means or barriers for a load advancing over the rolling elements of the thus-supported structura elements. It is emphasized, however, that the use of such a channel member is strictly optional because the structural elements themselves can be connected by the releasable connecting means in such a manner as to constitute any desired shape or roller conveyor construction.

The novel features which are considered as characteristic for the invention are set forth in particular in the appended claims. The invention itself, however, both as to its construction and its method of operation, together with additional objects and advantages thereof, will be best understood from the following description of the specific embodiments of the invention when read in connection with the accompanying drawing.

BRIEF DESCRIPTION OF THE DRAWING

FIG. 1 is a somewhat diagrammatic vertical section through a structural elements according to one embodiment of the invention, taken on the line I—I of FIG. 2;

FIG. 2 is a top-plan view of the structural element shown in FIG. 1;

FIG. 3 is a section taken on the line III—III of FIG. 2;

FIG. 4 is a perspective illustration of a structural element according to a further embodiment of the invention;

FIG. 5 is a perspective illustration of a structural element according to another embodiment of the invention;

FIG. 6 is a perspective illustration showing a plurality of the structural elements of FIGS. 1–3 mounted together in a channel-shaped supporting element;

FIG. 7 is a fragmentary perspective view showing two of the constructions of FIG. 6, but incorporating slight modifications, supported on I-beams;

FIG. 8 shows a plurality of the structural elements of FIGS. 1–10 mounted on a tubular supporting element;

FIG. 9 shows a plurality of structural elements according to a further embodiment of the invention, mounted on tubular supporting elements;

FIG. 10 is a fragmentary sectioned illustration showing details of an embodiment of releasable connecting means for the structural elements according to the present invention; and FIG. 11 is a view similar to FIG. 10 but illustrating yet a further embodiment of a releasable connecting means.

DESCRIPTION OF THE PREFERRED EMBODIMENTS

Discussing now the drawing in detail, and firstly the embodiment illustrated in FIGS. 1–3, it will be seen that reference numeral 10 generally identifies the structural elements of the set according to the present invention. For erecting roller conveyors two or any desired number of such structural elements will be connected together in the manner still to be discussed.

Each of the structural elements 10 of FIGS. 1–3 comprises a housing 12 which in this embodiment is of quadratic outline (compare FIG. 2) and which is provided in the two side faces 14, 16 thereof which extend at right angles to one another, with two pair of vertical parallel grooves 18 of undercut dovetail-shaped cross-section. The remaining two lateral faces 20, 22 are each provided with two vertical parallel projections or coupling heads 24 which are configurated so as to be matingly receivable in the grooves 18. With this construction, and if two of the structural elements 10 are to be connected with one another, it is simple necessary to insert the projections 24 of one of the elements 10 into respective corresponding grooves 18 of the adjacent structural element 10. Such insertion advantageously takes place endwise of the grooves 18. Evidently, the structural elements may be connected to form one or several parallel elongated rows, or other configurations including a large-surface conveyor floor, that is a conveyor construction which covers a large surface area rather than a narrow elongated strip.

The provision of two of the grooves 18 in one lateral face and of two of the projections 24 in an opposite lateral face in each of the housings 10 is particularly advantageous because this makes it possible to connect each of the structural elements 10 at each lateral face thereof not only with a single additional structural element 10, but with two of them. In other words, a projection 24 of a second structural element would be inserted into a groove 18 of the structural element shown in FIG. 10, and a projection of still a third structural element would be inserted into the groove 18 which is located on the same lateral face as the first-mentioned groove. This greatly increases the stability of a roller conveyor constructed in this manner. Furthermore, the rolling elements will thus be evenly distributed over the entire surface of the roller conveyor.

As FIG. 2 shows particularly clearly, each of the housings 12 is provided at diagonally opposite corners with bores, recesses, depressions or the like which are identified with reference numeral 26 and whose cross-section is smaller at their lower end to provide a shoulder 28 (compare FIG. 3). Thus, the individual housings 12 may be mounted on a support by inserting screws, bolts or the like into the respective recesses 26 and having them extend downwardly through the smaller-diameter portion of the recesses, with the head of the respective screw or bolts being supported on the shoulder 28. Of course, because of the highly stable manner in which the elements 10 can be connected to one another it will ordinarily not be necessary to so connect all housings 12 to a support, and instead only selected ones can be so connected if this is at all necessary.

FIGS. 1–3 show that the housing 12 is provided in its interior with two transversely spaced vertical box-shaped profiles 30 bounded by side walls 36 and by an inner wall 32, 34. The lower portion 32 of the inner wall is located farther inwardly than the upper portion 34, thus creating a step 30a at the juncture between the two. The side walls 36 are provided in the region of the upper portion 34 with projections 36a which extend towards one another, and below these projections 38 between the same and the shoulder 30a there is thus created a space 40 arranged to accommodate an end portion of a shaft 42 about which the respective rolling element turns. The rolling element is identified in FIGS. 1–3 with reference numeral 44 and in this embodiment is shown as being of cylindrical configuration. To mount it, it is simply necessary that it be lowered into the housing 12 and that the end portions of its shaft 42 be allowed to contact the projections 38 which, upon the exertion of downward pressure, are laterally deflected to an extent sufficient to permit the respective end portion of the shaft 42 to pass between them and to enter into the space 40 where it rests on the shoulder 30a. The projections 38 return to their original positions and thus maintain the shaft 42 against movement upwardly away from the shoulder 30a. In the embodiment of FIGS. 1–3 the housing 12 has an upper open side which is closed by a cover 46 provided with an opening 48. The cover has two or more downwardly extending projections 50 which are so arranged and configurated that, when the cover 46 is positioned on the upper open side of the housing 12 so as to close the same, as shown in FIGS. 1 and 3, the projections 50 will extend into the interior of the housing 12 and frictionally engage the wall portions 34. The position of the spaces 40 with reference to the upper side of the cover 46 is so selected that when the roller element 44 and the cover 46 are in place, a portion of the circumference of the roller element 44 will project upwardly beyond the upper side of the cover 46 as shown particularly clearly in FIGS. 1 and 3. Of course, a load to be conveyed on a roller conveyor assembled with the set according to the present invention will in the embodiment of FIGS. 1–3 contact and rest on the upwardly extending portions of the rolling elements 44 and will be movable in a direction transversely to the elongation of the shaft 42, that is transversely to the axis of rotation defined by the shaft 42. In FIG. 1, such movement will therefore be in a plane normal to the plane of the drawing.

The housing 12 and the cover 46 which of course constitutes in effect a part of the housing 12, are preferably of synthetic plastic material, produced by injection molding because this is a simple and inexpensive method of making them. The roller member 44 is installed in the manner already specified with the cover 46 not yet in place. Thereupon, the cover 46 is put in place as shown in FIGS. 1 and 3 and the projections 50 serve to retain it in this position. However, if desired the projections 50 can also be otherwise secured instead of by frictional action, for instance by adhesive bonding or the like. The roller members 44 are fully turnably mounted on the shafts 42.

The embodiment illustrated in FIG. 4 differs from that of FIGS. 1–3 only in that the cylindrically configurated rolling member 44 is replaced by a spherical rolling member 52. Like reference numerals indentify like elements as in FIGS. 1–3, except for the use of a prime symbol. Again, a portion of the spherical rolling element 52 projects beyond the upper side of the cover 46'. The manner in which the rolling element 52 can be mounted for free rotation in all directions is already known and it is not thought necessary to describe it in detail. For instance, it is known from the art to provide a large-dimensioned rolling element 52 which within the housing is supported in a dished supporting member wherein it rests on a plurality of small-dimensioned ball elements. The element 52 may also be supported in a liquid contained in the housing 12. The purpose of using the element 52 instead of the cylindrical element 44 is to make it possible to move a load in all directions in parallelism with the general plane of the upper side of the cover 46', instead of only in the direction normal to the axis of rotation of the rolling element 44, as in the embodiment of FIGS. 1–3. A further manner of accomplishing this increased freedom of movement—not illustrated because it is already known from the art—is to utilize a cylindrical rolling element of the type shown with reference numeral 44 in FIGS. 1–3 and to provide this at its periphery with a plurality of small approximately ellipsoid-shaped rollers whose axes of rotation extend in various different directions. In this case, also, a load can be moved with the same directional freedom as afforded by the element 52 of FIG. 4 because the cylindrical rolling element in turn rolls on the small rollers so that the orientation of its axis of rotation can be changed.

With the embodiments of FIGS. 1–4 a user can construct a variety of differently dimensioned and differently configurated roller conveyors. Thus, such a conveyor may for instance consist of a plurality of the elements 10 arranged in a single row, or two or more such rows may be provided side by side. Again, if particularly large loads are to be conveyed, or if it is desired that a large surface area be provided with the roller conveyor capacity, then the elements 10 may be so connected with one another as to cover an entire selected surface area. This may be the case for instance in the interior of freight-carrying aircraft. Furthermore, not only can the individual structural elements 10 be readily assembled in any desired configuration, but they can be just as readily disassembled for storage or for movement to another location in order to assemble a roller conveyor at such other location, and similarly it is a simple matter to change the configuration of a once-established roller conveyor if requirements change.

Coming now to the embodiment of FIG. 5 it will be seen that this corresponds substantially to that of FIGS. 1–3, with like reference numerals identifying like elements but being provided with a double-prime suffix. The difference between the embodiment of FIG. 5 and that of FIGS. 1–3 is that in the embodiment of FIG. 5 the housing 12" has an outline resembling an equal-sided hexagon. This configuration is particularly advantageous if large-surface roller conveyors are to be assembled, that is roller conveyors covering large surface areas rather than in form of narrow elongated rows or strips.

It is to be understood, however, that other configurations may also be selected for the outline of the housing as long as they make possible a reliable connection of two or more structural elements in the manner and for the purpose according to the present invention.

It is emphasized that the coupling means or connecting means for connecting the individual structural elements 10 to one another need not be those which have been illustrated herein. Other types or configurations of coupling or connecting means may be utilized, including hooks, dowels or pins, screws, bolts or the like. In fact, it would also be possible to utilize substantially U-shaped coupling elements whose arm or leg portions would be introduced into respective recesses 26 of adjacent structural elements 10, either from above or from below.

One such additional type of coupling or connecting means is illustrated in FIG. 10. Here we have shown two structural elements 10''' in fragmentary sectioned illustration. Here, two of the lateral faces of each housing are provided with projecting coupling heads 70 which extend outwardly and whose cross-section increases in direction away from the respective lateral face. The coupling heads 70, or at least their larger-diameter portions, consist for instance of slightly elastic elastically compressible material. The remaining lateral faces are provided with bores, recesses, cut-outs or the like identified with reference numeral 72 and so configurated that the coupling heads 70 may be received therein with a snap-action in response to temporary elastic compression. Of course, the arrangement of the projections 70 and the apertures 72 could also be different from what has been shown in FIG. 10.

Another possibility is illustrated in FIG. 11 where the structural elements shown are both identified with reference numeral 10. Unlike the embodiment of FIGS. 1–3, however, the structural elements shown in FIG. 11 are provided only with grooves 18 of dovetail-shaped cross-sectional configuration, not with the projections 24. Instead, separate connecting elements 19 of the illustrated cross-sectional configuration are provided so that, when the faces of the elements 10 which are provided with the grooves 18 abut one another—they have been illustrated spaced apart in FIG. 11 for the sake of clarity—each of the elements 19 is received in a pair of juxtaposed grooves 18 and the respective elements 10.

In accordance with the invention it is further possible to provide a channel member, that is a supporting member of substantially U-shaped channel-like cross-section. This is shown in FIG. 6 where this supporting member or channel member is identified with reference numeral 54. It accommodates a plurality of the structural elements 10 of FIGS. 1–3, arranged adjacent one another lengthwise of the member 54 and resting on the bight 56 thereof. The arms 58 in this embodiment project upwardly above the upper side of the covers 46 and thus form a lateral guide for a load advancing on the thus-constructed narrow elongated roller conveyor.

The embodiment illustrated in FIG. 7 shows two roller conveyors of the type illustrated in FIG. 6, modified only in so far as the arms 59—corresponding to the arms 58 in FIG. 6—do not project upwardly beyond the upper side of the covers 46 but instead extend at most flush with the upper side of these covers. Thus, by providing two or more of the thus-assembled roller conveyors adjacent one another, a wider roller conveyor may be formed. In addition, in FIG. 7 the individual roller conveyors are supported on I-beams 60 which are bridged by the roller conveyors. Finally, the embodiment of FIG. 7 differs from that of FIG. 6 also in that it utilizes not the structural elements of FIGS. 1–3 as in the case of FIG. 6, but instead utilizes a modified structural element 10a' which corresponds largely to the elements 10 except that it is provided with three of the rolling elements 44 instead of only a single one. Of course, such elements 10a' could also be provided with two of the rolling elements 44, or with more than three.

FIG. 9 shows another embodiment wherein the structural elements, identified with reference numeral 10a'' are elongated and utilize more than one roller element 44. In fact, in FIG. 9 each of the elements 10a'' utilizes six of the roller elements 44, and a plurality of these elements 10a'' may be arranged adjacent one another as shown by the two which are illustrated in FIG. 9 in phantom lines adjacent the one shown in full lines. The elements 10a'' of FIG. 9 bridge the spacing between tubular, cylindrical or otherwise configurated supporting members 66, which may be the constituent members of a large-mesh grid which latter may be composed of pipes, or which in fact may be any suitable support capable of supporting the members 10a'' and any load which is to be conveyed on them. FIG. 9 shows two possibilities of securing the members 10a'' to the members 66, and both of these possibilities may be used separately or together on one and the same member 10a''. Thus, it is either possible to use a pipe hanger 63 which embraces the respective element 66 and is secured via the screws 64 or other means to the underside of the respective structural element 10a'', or the underside may be provided with clamping means 68 which clampingly engages the elements 66 with a snap-action. Such clamping means 68 may be of the type illustrated in FIG. 9 and may be either of one piece with the housing of the respective structural elements 10a'' or be a separate element which is suitably secured thereto.

Finally, FIG. 8 shows an embodiment which also illustrates the connection of structural elements according to the present invention to a tubular or cylindrical supporting member which is identified with reference numeral 62. Here, however, the structural elements are those identified with reference numeral 10 and shown in FIGS. 1–3, and as illustrated they are secured to the member 62 by means of pipe hangers 63 and screws or other means 64, such as have been shown in FIG. 9.

It will be understood that each of the elements described above, or two or more together, may also find a useful application in other types of constructions differing from the types described above.

While the invention has been illustrated and described as embodied in an assembly set for erecting roller conveyors, it is not intended to be limited to the details shown, since various modifications and structural changes may be made without departing in any way from the spirit of the present invention.

We claim:

1. An assembly set for erecting roller conveyors, including at least two structural elements, each of said elements comprising a housing having a set of lateral faces and an upper side all of which are of identical size and outline; at least one recess provided in said upper side; a rolling element turnably accommodated in said recess and projecting in part upwardly beyond said upper side so as to contact and support a load which is to be transported on a roller conveyor erected with said set; and releasable connecting means for releasably connecting said structural elements to one another in a plurality of relative positions in each of which any two of said lateral faces of the respective housings are juxtaposed and said upper sides are at least substantially located in a common plane.

2. An assembly set as defined in claim 1, wherein said housings have an outline resembling a polygon.

3. An assembly set as defined in claim 1, wherein said housings have an outline resembling a regular polygon.

4. An assembly set as defined in claim 1, wherein said coupling means comprises mating male and female coupling portions respectively provided on at least one of said lateral faces of each of said structural elements.

5. An assembly set as defined in claim 4, wherein said coupling portions are of undercut configuration.

6. An assembly set as defined in claim 5, wherein said male and female coupling portions are undercut projections and undercut mating grooves, respectively.

7. An assembly set as defined in claim 6, wherein said projections and grooves are elongated in direction normal to the general plane of the respective upper side of said housings.

8. An assembly set as defined in claim 4, wherein said male coupling portions comprise coupling heads projecting from the respective lateral face and increasing in cross-section outwardly away from the same, and wherein said female coupling portions comprise recesses extending inwardly from the respective lateral face and dimensioned to accommodate one of said coupling heads with a snap action.

9. An assembly set as defined in claim 8, wherein said coupling heads consist at least in part of elastically compressible material.

10. An assembly set as defined in claim 1, wherein said sets of faces each include a pair of transversely spaced opposite lateral faces; and wherein said connecting means comprises at least one coupling portion provided on one and at least one other mating coupling portion provided on the other of said pair of lateral faces.

11. An assembly set as defined in claim 1, wherein said sets of faces each include a pair of transversely spaced opposite lateral faces; and wherein said connecting means comprises a first pair of coupling portions provided on one of said lateral faces and a second pair of mating coupling portions provided on the other of said lateral faces.

12. An assembly set as defined in claim 1, wherein said coupling means comprises mating male and female coupling portions with at least two such coupling portions being provided on each of said lateral faces.

13. An assembly set as defined in claim 1, wherein said housings consist at least in part of synthetic plastic material.

14. An assembly set as defined in claim 1, wherein said rolling element is a roller member mounted for rotation about an axis at least substantially paralleling the general plane of said upper side.

15. An assembly set as defined in claim 14, wherein said roller member is of substantially cylindrical configuration.

16. An assembly set as defined in claim 1, wherein said rolling element is of spherical configuration and freely rotatably accommodated in said recess.

17. An assembly set as defined in claim 1; and further comprising support means for supporting said structural elements in desired relationship with reference to one another.

18. An assembly set as defined in claim 17, wherein said support means comprises an elongated channel member of U-shaped cross-sectional configuration, said channel member having transversely spaced arms and being dimensioned to accommodate at least said two structural elements intermediate said arms and adjacent one another in longitudinal direction of said channel member.

19. An assembly set as defined in claim 18, wherein said arms project upwardly beyond the respective upper sides of said structural elements and constitute guides for a load which advances on said rolling elements.

20. An assembly set as defined in claim 17, said support means comprising at least one supporting element of cylindrical outline; and further comprising securing means for securing said structural elements releasably to said supporting element.

21. An assembly set as defined in claim 20, said structural elements each having a lower side; and wherein said securing means comprises elastically deflectable clamping means provided on said lower side and operative for engaging said supporting element with a snap action.

22. An assembly set as defined in claim 20, said structural elements each having a lower side which is to be supported on said supporting element; and wherein said securing means comprises at least one pipe hanger for each of said structural elements and mounting means mounting said pipe hanger on said lower side of said structural element so that the pipe hanger embraces said supporting element.

* * * * *